(12) United States Patent
Hsiao et al.

(10) Patent No.: US 7,889,458 B2
(45) Date of Patent: Feb. 15, 2011

(54) WRITE HEAD WITH SELF-CROSS BIASED POLE FOR HIGH SPEED MAGNETIC RECORDING

(75) Inventors: Wen-Chien David Hsiao, San Jose, CA (US); Terence Tin-Lok Lam, Cuptertino, CA (US); Changqing Shi, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1022 days.

(21) Appl. No.: 11/598,418

(22) Filed: Nov. 13, 2006

(65) Prior Publication Data

US 2008/0112078 A1    May 15, 2008

(51) Int. Cl.
 *G11B 5/31* (2006.01)
(52) U.S. Cl. .................................. 360/125.3; 360/128
(58) Field of Classification Search .............. 360/125.3, 360/125.16, 125.17, 128
See application file for complete search history.

(56) References Cited

U.S. PATENT DOCUMENTS

| | | | | |
|---|---|---|---|---|
| 4,555,740 A | | 11/1985 | Jackson et al. ............... 360/113 |
| 4,656,546 A | * | 4/1987 | Mallory .................. 360/125.03 |
| 4,740,855 A | * | 4/1988 | Diepers et al. ......... 360/125.03 |
| 4,748,525 A | * | 5/1988 | Perlov .................... 360/125.02 |
| 4,935,832 A | * | 6/1990 | Das et al. ..................... 360/121 |
| 4,974,110 A | * | 11/1990 | Kanamine et al. ....... 360/125.12 |
| 5,075,956 A | * | 12/1991 | Das .......................... 360/125.3 |
| 5,299,083 A | | 3/1994 | Kawada ...................... 360/106 |
| 5,512,394 A | | 4/1996 | Levenson et al. ............... 430/5 |
| 6,043,959 A | | 3/2000 | Crue et al. ................... 360/113 |
| 6,353,511 B1 | | 3/2002 | Shi et al. .................... 360/126 |
| 6,894,856 B2 | * | 5/2005 | Nakamura et al. ............ 360/55 |
| 2002/0071208 A1 | * | 6/2002 | Batra et al. ................. 360/125 |
| 2002/0176214 A1 | * | 11/2002 | Shukh et al. ................ 360/126 |
| 2005/0068678 A1 | * | 3/2005 | Hsu et al. .................... 360/126 |
| 2005/0083605 A1 | * | 4/2005 | Hu et al. ..................... 360/125 |
| 2005/0128637 A1 | * | 6/2005 | Johnston et al. ............. 360/125 |
| 2005/0243463 A1 | * | 11/2005 | Fontana et al. .............. 360/126 |
| 2005/0243464 A1 | * | 11/2005 | Lille .......................... 360/126 |
| 2005/0259354 A1 | * | 11/2005 | Piramanayagam et al. .. 360/125 |
| 2006/0098334 A1 | * | 5/2006 | Jayasekara et al. .......... 360/125 |
| 2006/0103977 A1 | * | 5/2006 | Lee et al. .................... 360/125 |
| 2006/0119984 A1 | * | 6/2006 | Nishida et al. .............. 360/128 |
| 2006/0171068 A1 | * | 8/2006 | Taguchi ...................... 360/125 |

* cited by examiner

*Primary Examiner*—Craig A. Renner
(74) *Attorney, Agent, or Firm*—Zilka-Kotab, PC

(57) ABSTRACT

A magnetic write head having a magnetic cross yoke arranged to provide a cross magnetic field in a pole tip region of the magnetic head. The cross field, which is perpendicular to the magnetization of write pole, reduces the switching time of the write field, thereby increasing the speed with which the write head can record data. The write head can be a longitudinal write head or a perpendicular write head. In the case of a perpendicular write, the write head can include a write pole arranged to provide a magnetic write field that emits a magnetic field substantially perpendicular with an Air Bearing Surface (ABS). A magnetic cross yoke is formed having ends that are disposed at opposite sides of the pole tip region of the write pole.

10 Claims, 6 Drawing Sheets

WRITE HEAD WITH SELF-CROSS BIASED POLE FOR HIGH SPEED MAGNETIC RECORDING

FIELD OF THE INVENTION

The present invention relates to magnetic recording and more particularly to a structure for a magnetic write head that increases recording speed by assisting write pole magnetization switching with cross bias field.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, referred to as a spacer layer, sandwiched between first and second ferromagnetic layers, referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

Regardless of whether a perpendicular or longitudinal data recording system is used, current and future data recording systems require ever increasing data rates. One factor that crucially affects the data rate of a magnetic recording system is the write pole magnetization switching. The write pole switching limits the rate at which the data bit may be recorded as the magnetization of the medium transitions from one magnetic direction to the other. Therefore, in order to increase data rate, there is a strong felt need for a recording head that can induce fast write pole magnetization switching, in order to increase the speed with which a recording system can record data.

SUMMARY OF THE INVENTION

The present invention provides a magnetic write head that includes a magnetic cross yoke arranged to produce a magnetic cross field that extends across a pole tip region of a magnetic pole of the write head.

The presenting invention can be embodied in a longitudinal write head or in a perpendicular write head. The cross yoke produces a magnetic cross field that enables the gyro-procession of the magnetization moment within the write pole during switching. This gyro-procession of the magnetization moment advantageously reduces the switching time, allowing the write head to write at an increased speed (data rate).

If embodied in a perpendicular magnetic write head, the cross yoke can be formed to have first and second ends that are disposed at either side of the pole tip region of the write pole. If embodied in a longitudinal write pole, the cross yoke can be constructed to have first and second ends that terminate at opposite sides of a pole tip region of the pole tip region defined by first and second magnetic pole structures, the first and second magnetic pole structures being separated by a non-magnetic write gap layer.

Magnetic flux in the cross yoke can be provided by a magnetomotive force, resulting in the magnetic cross field being emitted between the first and second ends of the cross yoke. This magneticmotive force can be provided by, for example, electrically conductive stud(s) that extend substantially perpendicular to a plane defined by the coil. The stud(s) can be, for example, a stud or studs that joins the two coil layers together (in a dual pancake coil and/or Helical coil design) or can be a stud that provides electrical connection to the coil from a point higher in the build structure.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
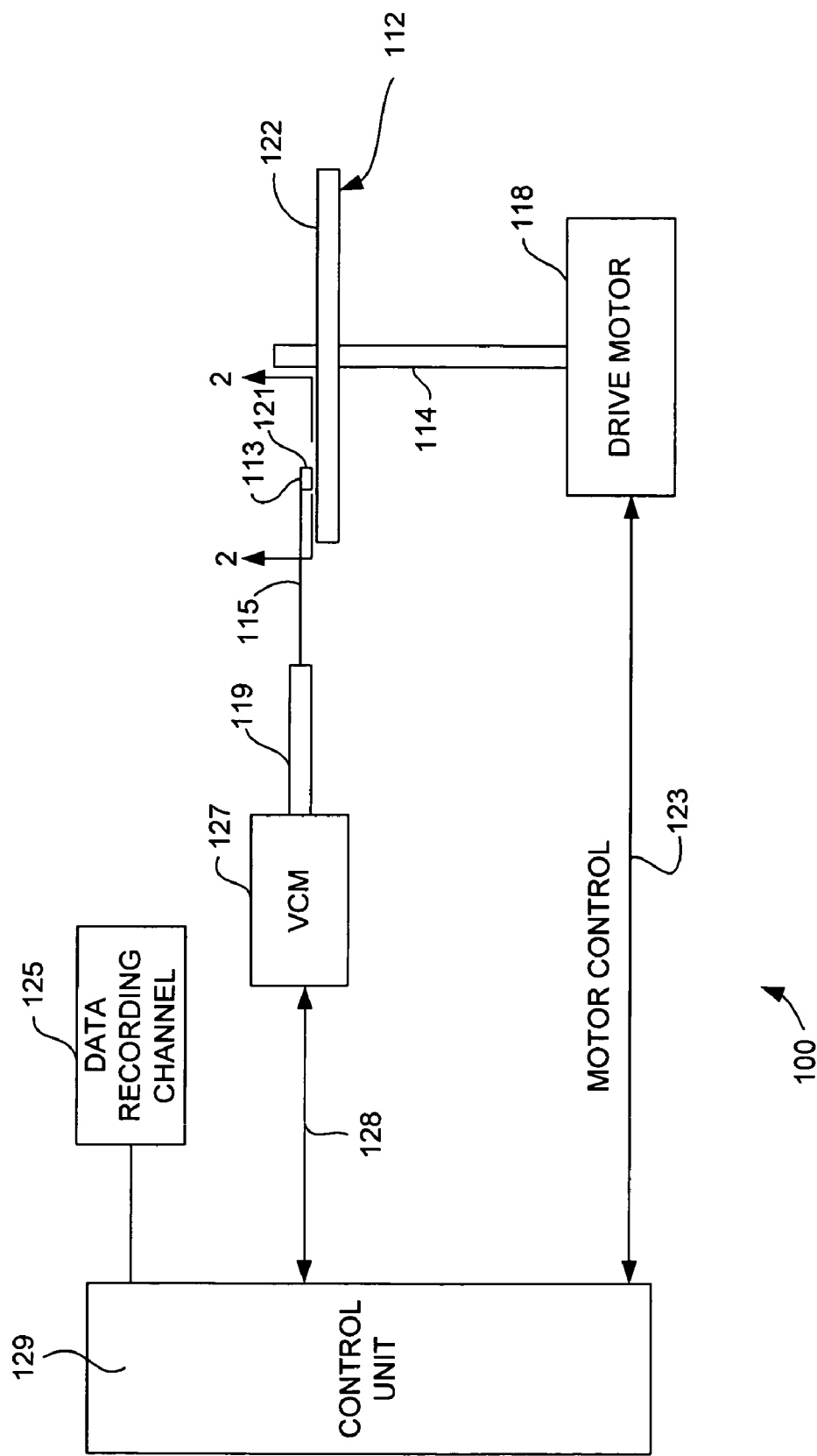
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
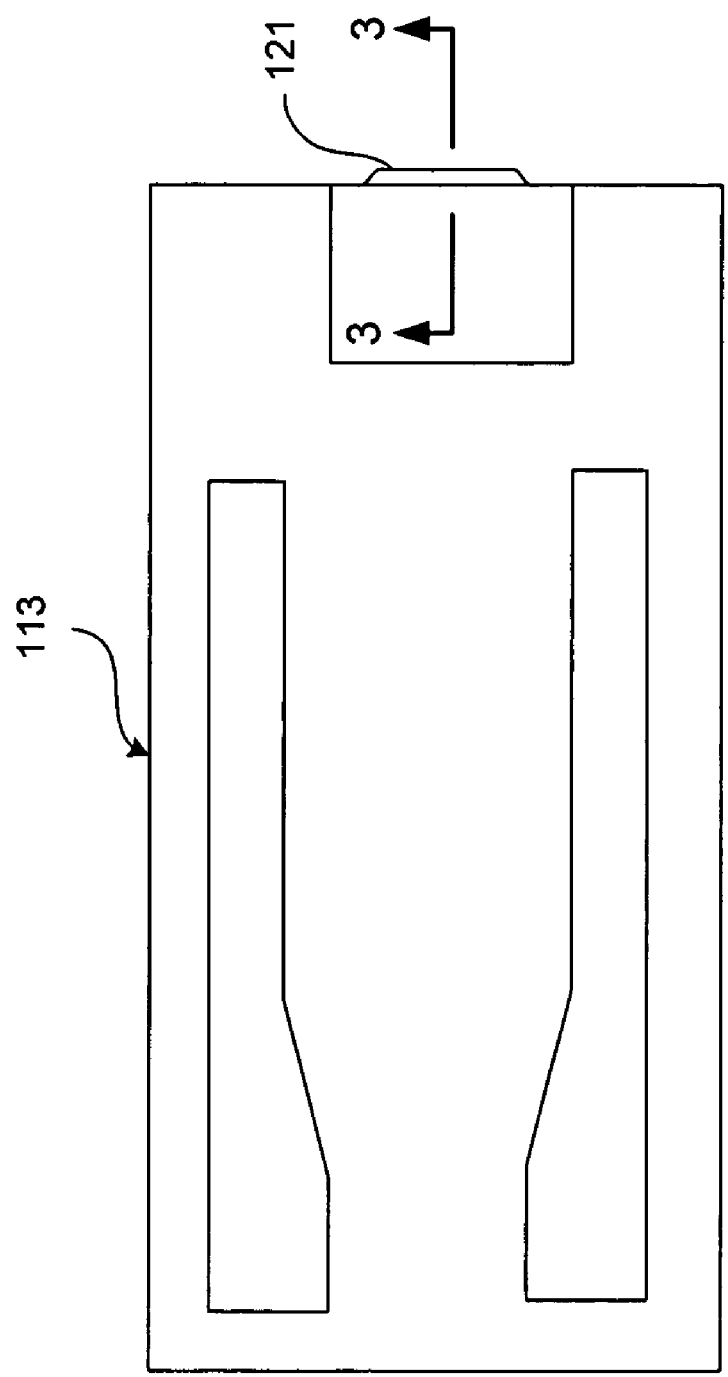
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
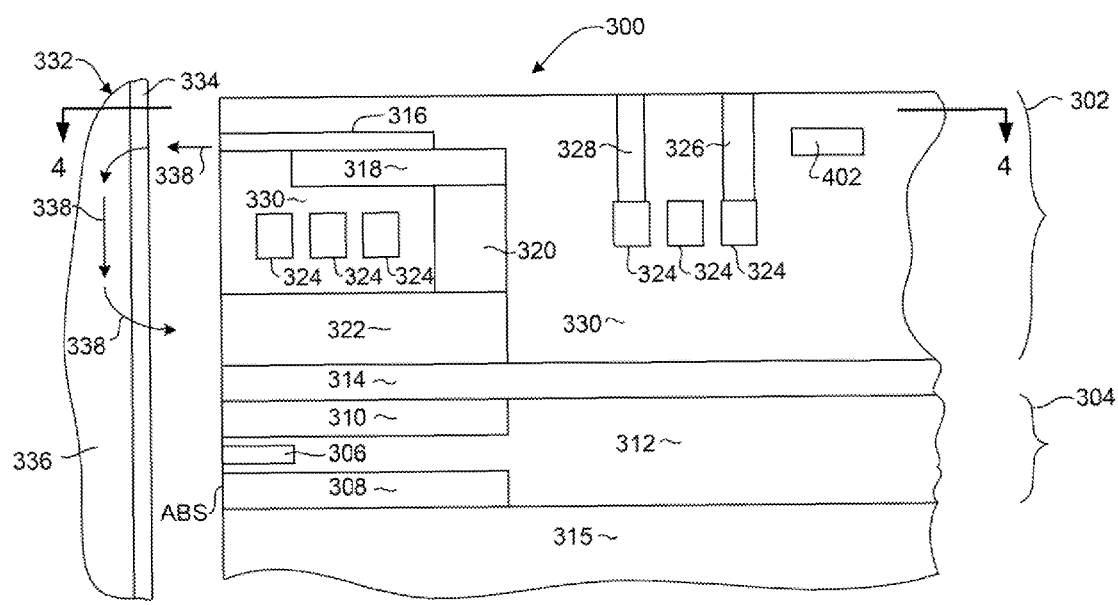
FIG. 3 is a cross sectional view, taken from line 3-3 of FIG. 2 and rotated 90 degrees counterclockwise, of a perpendicular magnetic head according to an embodiment of the present invention.

With reference now to FIG. 3, a magnetic head 300 for use in a perpendicular magnetic recording system is described. The magnetic head includes a write element 302 and a read element 304. The read element 304 includes a magnetoresistive sensor 306 sandwiched between first and second magnetic shields 308, 310 and embedded in a non-magnetic, electrically insulating material 312. The write element 302 and read element 304 can be separated from one another by a non-magnetic, electrically insulating gap layer 314, and may be formed upon a non-magnetic, electrically insulating substrate 315 such as alumina.

Figure 4:
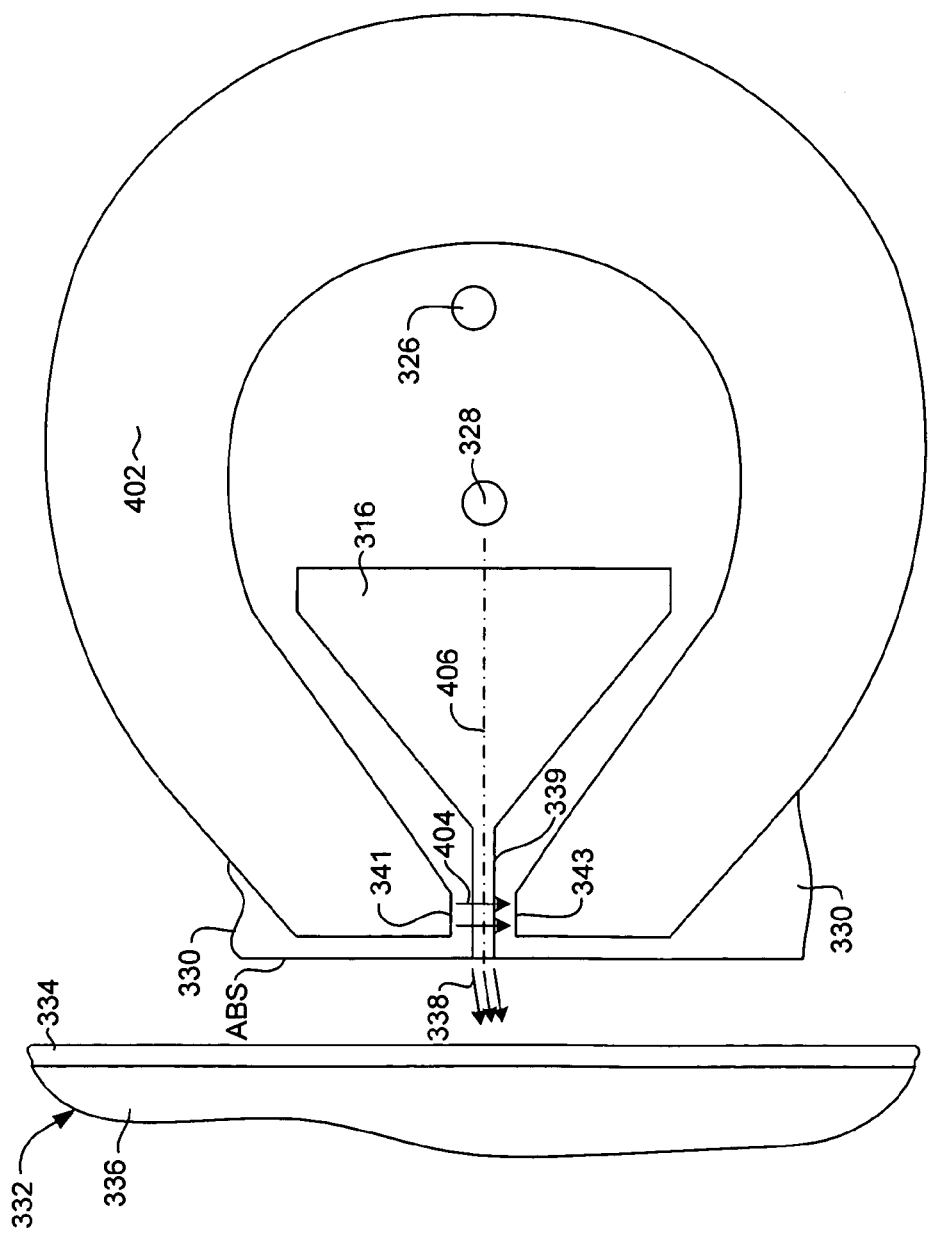
FIG. 4 is top down sectional view taken from line 4-4 of FIG. 3.

The write element 302 includes a write pole 316, which is magnetically connected to a magnetic layer that can be referred to as a shaping layer 318. The shaping layer is magnetically connected with a magnetic back gap layer 320 at an area away from the air bearing surface (ABS). A magnetic return pole 322 is also magnetically connected with the back gap 320 in an area away from the ABS. The return pole 322, back gap 320 and shaping layer 318 can all be constructed of a magnetic material such as NiFe, CoFe or some other material. The write pole 316 is constructed of a magnetic material and is preferably a lamination of high moment magnetic layers such as CoFe separated by thin layers of non-magnetic material such as alumina. As seen in FIG. 4, the write pole 316 has a pole tip region 339 disposed toward the ABS having first and second laterally opposed sides.

With continued reference to FIG. 3, the write element 302 also includes an electrically conductive write coil 324 that passes through the write element 302 between the return pole 322 and the shaping layer 318 and write pole 316. The write coil 324 can be constructed of, for example, Cu and extends wraps around the back gap 320. The coil 324 can be a flat coil (pancake coil) that defines a plane. Inner and outer turns of the write coil are connected with contact studs 326, 328 that are oriented generally perpendicular to the plane defined by the coil 324, extend through an insulation fill layer 330 to provide electrical connection to the write coil 324. The coil 324 is embedded in a non-magnetic, electrically insulating layer 330.

When an electrical current flows through the write coil 324 a magnetic flux flows through the write return pole 322 back gap 320, shaping layer 318, and write pole 316. A magnetic field emits from the end of the write pole 316 in a direction that is generally, although not exactly, perpendicular to the surface of a magnetic medium 332. The magnetic medium 332 includes a thin, magnetic hard (high coercivity) top layer 334, and a magnetically soft (lower coercivity) under-layer 336. The magnetic field 338, from the write pole 316 passes through and magnetizes the high coercivity top layer 334 and then travels through the magnetically soft under-layer 336 to return to the return pole 322, thereby completing a magnetic circuit. The magnetic return pole has a cross section at the ABS that is much larger than the cross section of the write pole 316 so that when the magnetic flux returns to the return pole 322 it is sufficiently week and spread out that it does not magnetize the top layer 334, when passing back through to the return pole 322.

With reference now to FIG. 4, a top down cross sectional view taken from line 4-4 of FIG. 3, shows that the write head 302 includes a magnetic cross yoke 402. The cross yoke 402 has first and second ends 341, 343 located at either side of the pole tip portion 339 of the write pole 316, thereby defining a non-magnetic gap between the ends of the cross yoke 402. This cross yoke, applies a magnetic cross field 404 that is substantially parallel with the surface of the magnetic medium 332, and perpendicular to the direction that the axis 406 of the write pole 316. The field 404 from the cross yoke 402 slightly cants the magnetic field 338, so that the field 338 is not perfectly perpendicular to the surface of the medium 332.

The magnetomotive force that causes a magnetic flux to flow through the cross yoke (thereby generating the cross field 404) can come from one or both of the studs 326, 328, which act as a single turn of a coil. The strength of the cross field 404 does not have to be nearly as strong as the strength of the write field 338, so the amount of magnetomotive force from one or both of the studs 328, 326 can provide sufficient magnetomotive force.

The presence of the cross field 404 from the cross yoke 402 reduces switching time of write pole 316, 339, thereby increasing the speed with which the write head 302 can write data. As the electrical current in the write coil 324 switches polarity, the magnetization of the write pole 316 cannot easily or quickly switch 180 degrees, therefore write field would switch slowly and the recording of data bit would deteriorate under high data rates. By providing the cross field 404, the resulting switching of write pole magnetization is facilitated by the fast gyro-procession around the cross field 404.

Figure 5:
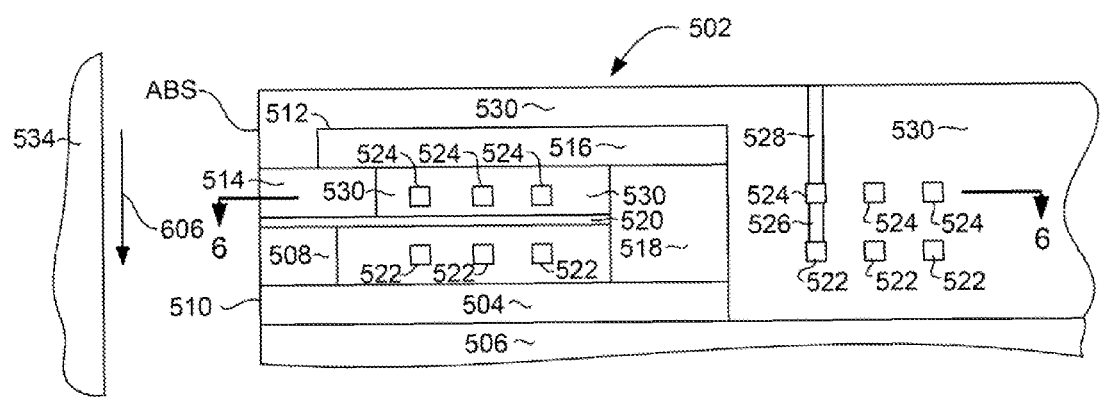
FIG. 5 is a cross sectional view of a write head for use in a longitudinal data recording system.

With reference now to FIG. 5, the present invention can also be embodied in a system that uses a longitudinal magnetic write head 502. Such a system would also include a read element as described earlier with reference to FIG. 3, however, this read portion has been omitted from FIG. 5 for clarity. The write head 502 can include a first or bottom pole (P1) 504 formed on a non-magnetic substrate 506, such as alumina. The first pole (P1) can be constructed of various magnetic materials such as NiFe or CoFe. A magnetic pedestal (P2) 508 may be formed on top of the P1 pole 504. This P2 structure can be constructed of a high saturation (high Bsat) material and can be constructed of CoFe or NiFe. The P1 and P2 structures to together can be considered to be a lower magnetic pole 510. The write head also includes an upper pole 512 that may include a P3 magnetic structure 514 and a P4 magnetic structure 516, both of which can be constructed of a magnetic material such as NiFe or CoFe. The upper and lower poles 510, 512 are magnetically connected away from the air bearing surface ABS by a back gap structure 518 that is also constructed of a magnetic material such as NiFe or CoFe. The upper and lower poles 510, 512 are separated from one another at the ABS by non-magnetic write gap layer 520. One or more magnetic coils pass through the yoke formed by the upper and lower poles 510, 512 and back gap 518. For purposes of the presently described embodiment, the write head 502 will be described as having two electrically conductive coils 522, 524, both of which pass between the upper and lower poles 510, 512. The coils 522, 524 wrap around the back gap 518 and can be connected to one another by a link or stud 526. A contact stud 528 extends upward through an insulation fill layer 530 to provide electrical connection with the coils 522, 524. Another connection link and contact stud can also be provide, such as at the outer coil, but has been omitted for clarity.

When electrical current flows through the coils 522, 524, the resulting magnetic field causes a magnetic flux to flow through the yoke formed by the upper and lower poles 510, 512 and back gap 518. This magnetic flux results in a magnetic fringing field 532 that jumps across the write gap 520 at the ABS resulting in a magnetic field that is generally parallel with the surface of the magnetic media 534. This fringing write field 532 is nearly parallel with the direction of the data track 606, but is canted slightly, as will be apparent herein below.

Figure 6:
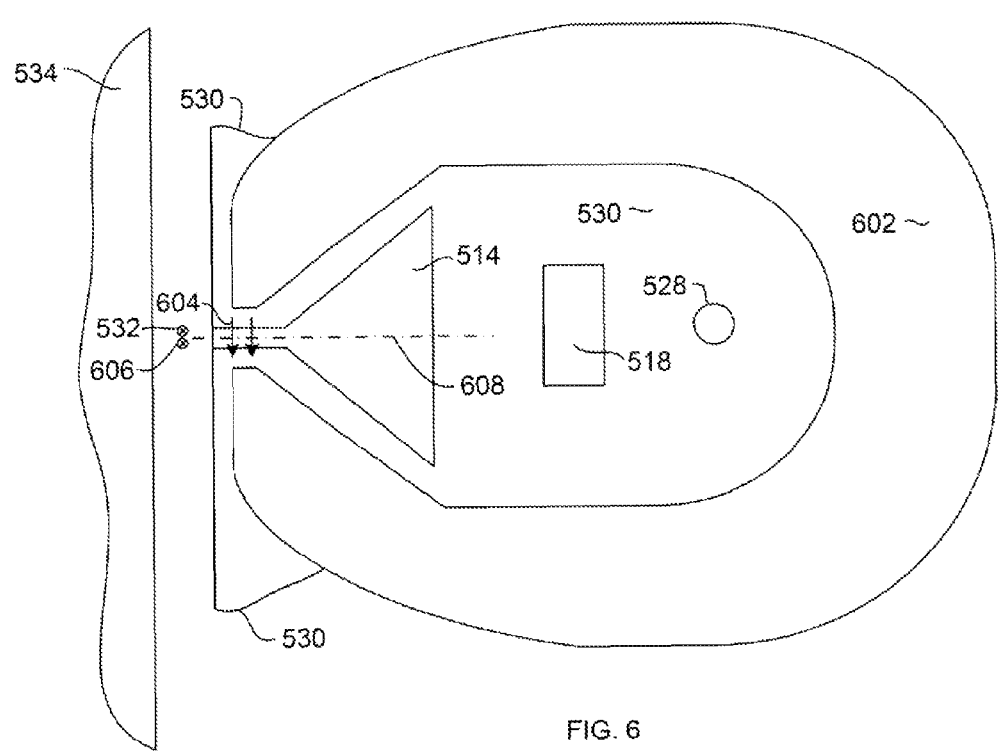
FIG. 6 is a top down sectional view taken from line 6-6 of FIG. 5.

With reference now to FIG. 6, a top down cross sectional view shows that the write head 302 also includes a magnetic cross yoke 602 that can be constructed of a magnetic material such as NiFe or CoFe. This cross yoke 602 produces a cross magnetic field 604 that is generally perpendicular to an axis 608 of the P3 pedestal 514. This cross field is also perpendicular to the direction of a data track which would be directly into or out of the plane of the page in FIG. 6. Magnetomotive force for driving magnetic flux through the cross yoke 602 can come from the coil link 526, or could come from some other structure.

As with the embodiment described with reference to FIG. 6, the cross field causes the magnetization of write pole 514 to be canted slightly from the direction it would otherwise be. In this case, without the cross field, the magnetization of write pole 514 would be oriented substantially parallel with the data track 606. As described above, with reference to FIG. 4, if the write head were required to switch between pure up-track and down-track orientations, the magnetization would have to be switched 180 degrees. For reasons discussed above, this would decrease the switching speed significantly therefore limit the recording data rate.

According to the present invention, however, the cross field 604 from the cross yoke 602 slightly cants the magnetization of write pole 514 so that the switching of write pole magnetization become much faster through gyro-procession. This results in an reduced write field switching time and improved recording data rate.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head for perpendicular magnetic recording, comprising:

a magnetic write pole having an end disposed toward an air bearing surface (ABS);

a write coil configured to induce a magnetic flux through the write pole, resulting in a magnetic field being emitted from the end of the write pole;

a magnetic cross yoke, arranged about the write pole and recessed from the air bearing surface (ABS); and a magnetomotive force configured to induce a magnetic flux in the cross yoke, resulting in a magnetic cross field extending across the write pole in a direction that is perpendicular to a data track to be written by the write head.

2. A magnetic write head as in claim 1, wherein the cross yoke further comprises first and second ends forming a gap that extends across the write pole.

3. A magnetic write head as in claim 1 wherein the write pole has an axis, and wherein the yoke produces a write field that is substantially perpendicular to the axis of the write pole.

4. A magnetic write head as in claim 1 wherein the magnetomotive force comprises an electrically conductive stud that is electrically connected with the write coil.

5. A magnetic write head as in claim 1 wherein the cross field alters the direction of a write field emitted by the write pole.

6. A magnetic write head as in claim 1 wherein the ABS defines a plane and wherein the cross field is substantially parallel with the plane defined by the ABS.

7. A magnetic write head for magnetic data recording, comprising:

a magnetic pole having an axis, and extending to an air bearing surface;

a write coil configured to induce a magnetic flux in the magnetic pole;

a magnetic cross yoke, configured to induce a cross magnetic field that passes through the magnetic pole and that is substantially perpendicular to the axis of the magnetic pole and substantially perpendicular to a direction of a data track to be written by the write head, the magnetic cross yoke being recessed from the air bearing surface; and a magnetomotive force for inducing a magnetic flux in the cross yoke.

8. A magnetic write head for magnetic data recording, comprising:

a magnetic pole having a pole tip portion that extends to an air bearing surface;

a write coil configured to induce a magnetic flux in the magnetic pole;

a magnetic cross yoke having first and second ends defining a gap therebetween, the gap extending across the pole tip portion of the magnetic pole, the magnetic yoke being configured to induce a magnetic cross field that extends across the gap in a direction that is perpendicular to a data track to be written by the write head, the magnetic cross yoke being recessed from the air bearing surface; and a magnetomotive force for inducing a magnetic flux in the cross yoke.

9. A magnetic write head for perpendicular magnetic recording, comprising:

a magnetic write pole having a pole tip region disposed toward an air bearing surface (ABS), the pole tip region having first and second laterally opposed sides and terminating in an end disposed at the ABS;

a magnetic return pole having an end disposed toward the ABS;

a magnetic back gap structure magnetically connected with the return pole and the write pole in a region away from the ABS;

an electrically conductive write coil that wraps around the back gap structure and that, when electrical current flows through the coil, induces a magnetic flux through the return pole, back gap structure and write pole, resulting in a magnetic write field being emitted from the end of the write pole; and a magnetic cross yoke surrounding and separated from the write pole and terminating in first and second ends that are located at either side of the pole tip region of the write pole, the magnetic cross yoke being recessed from the air bearing surface (ABS);

wherein the cross yoke produces a magnetic cross field that extends across the pole tip region of the write pole.

10. A magnetic head as in claim 9 wherein the magnetic cross field alters the direction of the write field.

* * * * *